US006555987B2

United States Patent
Leenhouts

(10) Patent No.: US 6,555,987 B2
(45) Date of Patent: Apr. 29, 2003

(54) STEP MOTOR CONTROL FOR ACCOMMODATING FRICTION LOAD VARIATION

(75) Inventor: Albert C. Leenhouts, Kingman, AZ (US)

(73) Assignee: Seiberco Incorporated, Braintree, MA (US)

( * ) Notice: Subject to any disclaimer, the term of this patent is extended or adjusted under 35 U.S.C. 154(b) by 6 days.

(21) Appl. No.: 09/903,887

(22) Filed: Jul. 12, 2001

(65) Prior Publication Data

US 2003/0011339 A1 Jan. 16, 2003

(51) Int. Cl.⁷ .............................................. H02P 8/04
(52) U.S. Cl. ........................................ 318/696; 318/431
(58) Field of Search ................................ 318/696, 685, 318/430, 431

(56) References Cited

U.S. PATENT DOCUMENTS 4,775,825 A * 10/1988 Moribe et al. ............... 318/696
5,274,316 A * 12/1993 Evans et al. ................. 318/696

* cited by examiner

Primary Examiner—Bentsu Ro
(74) Attorney, Agent, or Firm—Ira S. Dorman

(57) ABSTRACT

Gradually increasing and decreasing the friction torque feedforward term in time, prior to and immediately following intended motion, respectively, reduces the effects of variations in Coulomb friction load in an open loop step motor system.

7 Claims, 2 Drawing Sheets

STEP MOTOR CONTROL FOR ACCOMMODATING FRICTION LOAD VARIATION

BACKGROUND OF THE INVENTION

Step motors, with associated driver circuits and controllers, are widely used for driving mechanical loads through prescribed trajectories. The response of any step motor system, operated in the open loop control mode, is affected by changes in the drive system and the mechanical load. System design considerations include trajectory and load parameters, as well as characteristics of the drive system, and the quality of such system designs is often judged by the degree to which the load response is sensitive to variations in important system component parameters; i.e., by the ability of the system to cope with changes in parameters that include the available pullout torque, the load parameter values, and the initial system conditions.

The drive system and the load parameters for a given application are often fairly well known, and subject to vary over only a limited range; that is so, for example, in medical and office equipment applications. To build more sophisticated systems however (such as expert systems), it is necessary to consider the nature of the effects of small and large parameter variations upon the response of the motor and load, and to consider the specific design choices that influence such sensitivities.

When a step motor system is selected to drive a given load through a defined trajectory, torque utilization (i.e., the maximum fraction of the available pullout torque required to perform the motion under nominal system conditions), is an important consideration; the intended motion trajectory also strongly influences the system sensitivity to changes in at least some parameter values. An effective way to reduce the system sensitivity to changes in inertial load, for example, is to remove from the trajectory the frequency component equal to the nominal system resonance frequency. Similarly, and although friction is generally kept low in precision mechanisms, changes in the Coulomb friction load are now found to influence system response substantially, and to introduce uncertainty as to the initial motor positions; the present invention concerns such friction load effects.

As used herein, the following definitions apply:

Pullout Torque: This is the maximum torque $T_P$ that a step motor can provide at a given speed, under steady state conditions, without losing synchronism.

Coulomb Friction: This is a friction load torque, having with an amplitude that is independent of velocity but that always opposes the motion.

Step State: The torque $T_M$ of the motor follows from:

$$T_M = T_P \cdot \sin\left(2\pi \frac{V_C}{N_V} - N\theta\right)$$

wherein $V_c$ represents the step state, $T_M$ is the torque produced by the motor, $N_v$ is the drive system resolution in step states/cycle, $N$ is the polecount of the motor, and $\theta$ is the physical position, in radians, of the rotor of the motor relative to the stator. As a practical matter, $V_c$ can be regarded to be the number that commands the phase currents to the motor, and thereby the torque produced. In many step motor systems the content of a pulse counter constitutes the step state $V_c$; in other such systems the value of $V_c$ is fed directly into the motor driver circuit.

Step Sequence: This is a string of data that specifies the value of the step state $V_c$ as a function of time.

Torque Feedforward: The step sequence that describes the value of $V_c$ as a function of time has two components; one defines the intended position $\theta$, and the other, the torque feedforward term, controls the motor torque at that intended position. It is necessary to include a torque feedforward term in the step sequence to ensure that, in normal operation, the motor response under nominal conditions is close to that which is intended.

The torque $T_{RQ}$ required to drive a motor and load through the trajectory equals:

$$T_{RQ} = \alpha(J_L + J_M) + T_C \frac{\omega}{|\omega|}$$

where:
  $\alpha$=acceleration
  $J_L$=the load inertia
  $J_M$=the inertia of the rotor of the motor
  $T_c$=the coulomb friction
  $\omega$=the velocity For all steps resolutions at which two-phase step motor systems are commonly driven, the step state $V_c$ should follow the general equation:

$$V_C = \frac{N_V}{2\pi}\left(N\theta + \sin^{-1}\frac{T_{RQ}}{T_P}\right)$$

where:
  $N_v$=the drive system resolution
  $N$=the motor polecount
  $\theta$=the position
  $T_P$=the pullout torque at speed $\omega$ The term $N\theta$ in the equation is the position-related term, and the arcsine function is the torque feedforward term.

SUMMARY OF THE INVENTION

The objects of the invention are to provide a method for driving an open loop step motor so as to efficiently accommodate variations in the friction load torque of a system including the motor, and to provide a system in which the method is implemented. The objects are attained, in part, by the provision of a method in which a multiplicity of step sequences for driving a motor are so generated that each sequence is characterized as having a torque feedforward ramp-up component that increases gradually from zero, at a time just prior to commencement of intended movement of the motor armature, to a value, at the instant of initial intended armature movement, just sufficient to overcome the nominal Coulomb friction load torque of the system.

Preferably, each step sequence will be further characterized as having a torque feedforward ramp-down component that decreases gradually from the value that overcomes the friction load torque of the system, at the conclusion of intended armature movement, to zero at a time just subsequent to the instant at which intended movement of the armature stops. The duration of the ramp-up and ramp-down components will most desirably be substantially equal to one cycle of the natural resonance frequency of the system.

Other objects of the invention are attained by the provision of a system comprising a step motor and a controller for driving the motor in open loop mode, wherein the controller comprises electronic data processing means programmed for generating a multiplicity of step sequences characterized by having torque feedforward ramp-up and ramp-down components of the nature described. The system may additionally implement the preferred and most desirable embodiments of the method set forth, and may further include means, operatively connected to the controller, for measuring directly the load friction torque of the system.

DETAILED DESCRIPTION OF THE PREFERRED AND ILLUSTRATED EMBODIMENTS

It has been found that sensitivity to Coulomb friction changes can be unexpectedly large in step motor systems of the kind described herein. It has also been observed that if the actual load friction is smaller than the expected value the torque feedforward component introduces a torque disturbance at the beginning of the motion, which may cause velocity ripple about the intended value that will persist throughout the motion. At least in common trapezoidal trajectories, moreover, the duration of the motion may cause the phase of the velocity ripple to be such that, when the Coulomb friction torque feedforward term is set back to zero at the end of the motion, another torque disturbance is introduced which further increases the vibration. These aberrations are reduced significantly by the present technique, whereby the step sequence is modified during short time intervals just before, and immediately following, the actual motion.

Figure 1:
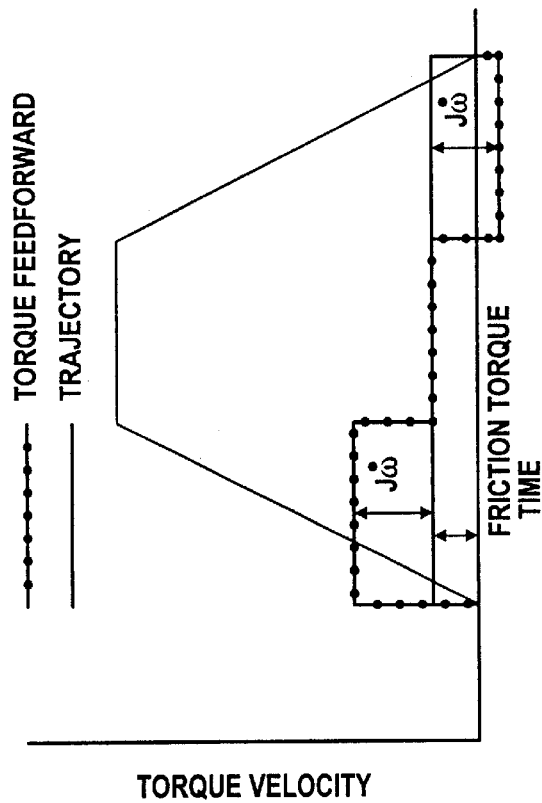
FIG. 1 is a plot depicting the torque feedforward term, as a function of time, of a conventional step sequence utilized to generate a trapezoidal trajectory for an open loop step motor.
Figure 3:
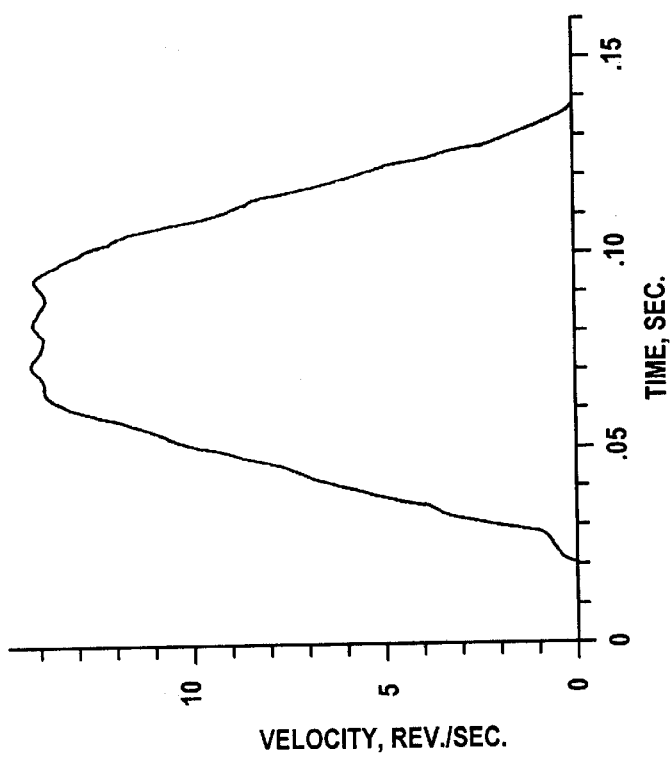
FIG. 3 is a curve depicting the system response utilizing a conventional feedforward term in the step sequence for an open loop step motor.

In producing a typical trapezoidal trajectory, one part of the torque feedforward term reflects the torque needed to overcome the Coulomb friction and a second part reflects the torque required to accelerate and decelerate the motor and load; FIG. 1 shows both components, and their sum, as a function of time. If the actual Coulomb friction is lower than the expected value, the sudden jump in torque resulting from the torque feedforward term in the step sequence will tend to cause a torque disturbance, and in an undamped step motor system the resulting torque ripple will persist throughout the motion; these velocity perturbations are seen in the response curve of FIG. 3.

Figure 2:
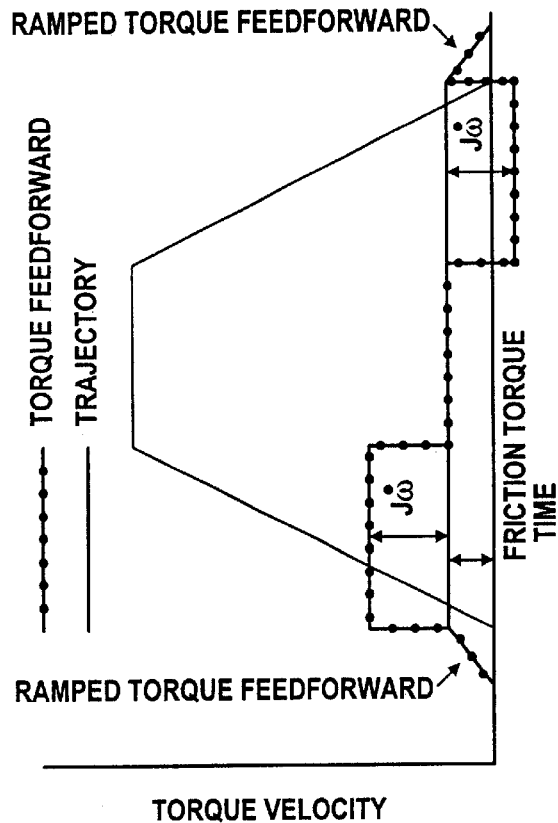
FIG. 2 is a corresponding plot depicting the torque feedforward term of a step sequence in accordance with the present invention, utilized to generate the same trajectory.
Figure 4:
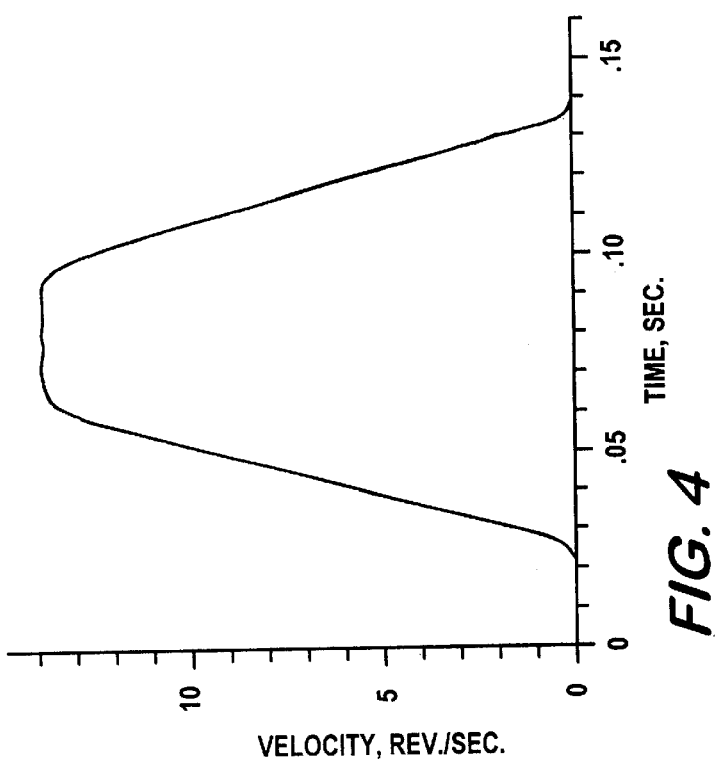
FIG. 4 is a corresponding curve showing the system response when the torque feedforward term includes a ten millisecond ramp-up component, in accordance with the invention.

In accordance with the present invention, gradually increasing the torque feedforward term to the required value, during a short time interval before actual motion commences (as illustrated in FIG. 2), avoids the introduction of the sharp torque variations that result in velocity ripple (as can be seen in the response curve of FIG. 4). Similar benefit is realized by allowing the torque feedforward term to decline gradually after the completion of the motion.

If, for example, the friction load is very much lower than that which is expected, and the motor has reached a zero speed, zero torque condition exactly at the end of the desired motion but at the wrong position, a sudden change in the commanded torque versus position relationship, carried in the step sequence, will produce additional (unintended) motion. Adding the ramp-down torque feedforward commands tends to prolong, or "stretch out," the torque disturbance over approximately one resonance cycle, thereby causing the motion that occurs to be relatively gentle and to settle quickly. In applications in which the primary concern is with velocity ripple that occurs while movement of the motor at a precise specified speed, however, there may be little or no benefit in providing such a postmovement ramp-down component.

The ramping time (i.e., the time interval prior to or following intended motion, during which the gradual increase or decrease in the torque feedforward term occurs) is not regarded to be particularly critical. Although the beneficial effect increases gradually with increasing ramp time, most of the benefit is realized when the duration equals one cycle of the natural resonance frequency of the system, and obviously an excessively long ramp time would objectionably delay actual motion. Simulations show that even a relative short torque feedforward "ramping time" of 10 milliseconds can reduce the effects of Coulomb friction torque changes on the system response by a factor of two to three. Moreover, it should be noted that, because the ramp of the friction torque feedforward occurs only before and after actual motion, the shape of the motion trajectory does not affect the ramp parameters.

To enable the control system to generate the appropriate value of the friction torque feedforward term, knowledge of the nominal friction load is required. The necessary information can be obtained through classic measurement techniques, and entered into the memory of the controller that generates the step sequence. For example, since the power supply current into the motor driver circuit reflects the torque provided by the motor, by driving the load at a constant speed (thus eliminating torque due to acceleration or deceleration), and observing this current, the friction load can be measured readily. In other instances the step motor driver might itself advantageously be equipped with an algorithm that allows direct measurement of the load friction.

Figure 5:
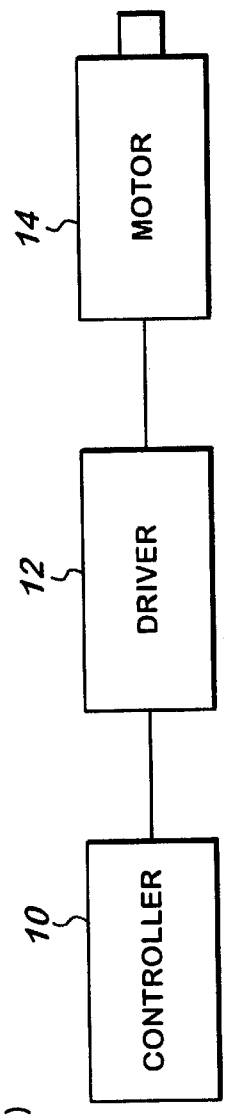
FIG. 5 is a diagrammatic representation of a system embodying the invention.

FIG. 5 of the drawings diagrammatically illustrates a system embodying the invention, comprised of an operatively interconnected controller 10, driver 12 and motor 14. The controller 10 is programmed to generate step sequences having torque feedforward ramp-up and ramp-down components, as described, and the motor driver 12 is equipped to allow direct measurement of load friction.

Simulations have shown that torque feedforward ramping, as described, reduces the sensitivity of the system response to variations in initial positon, as well. Finally, it is to be noted that a further reduction in the system sensitivity to Coulomb friction changes can be obtained by adjusting the friction torque feedforward term to attain a value that is somewhat higher than the nominal load friction value.

Thus, it can be seen the that present invention provides a method for driving an open loop step motor so as to efficiently accommodate variations in the friction load torque of a system including the motor, as well as providing a system in which the method is implemented. The technique is especially useful when variable friction loads are moved short distances at a high repetition rate, and when a precise response is needed throughout the range of motion.

Having thus described the invention what is claimed is:

1. A method for driving an open loop step motor, so as to efficiently accommodate variations in the friction load torque of a system including the motor, comprising generating a multiplicity of step sequences for driving the motor, each of said step sequences being characterized as having a torque feedforward ramp-up component that increases gradually from zero, at a time just prior to commencement of intended movement of the motor armature, to a value, at the instant of intended initial armature movement, just sufficient to overcome the nominal friction load torque of the system.

2. The method of claim 1 wherein the duration of said ramp-up component is substantially equal to one cycle of the natural resonance frequency of the system.

3. The method of claim 1 wherein each of said step sequences is further characterized as having a torque feedforward ramp-down component that decreases gradually from said sufficient value, at the conclusion of intended armature movement, to zero at a time just subsequent to the instant at which intended movement of the armature stops.

4. A system comprising a step motor and a controller for driving said motor in open loop mode so as to efficiently accommodate variations in the friction load torque of said system, said controller comprising electronic data processing means for generating a multiplicity of step sequences for driving said motor, said electronic data processing means being so programmed that each of said step sequences generated thereby is characterized as having a torque feedforward ramp-up component that increases gradually from zero, at a time just prior to commencement of intended movement of the motor armature, to a value, at the instant of intended initial armature movement, just sufficient to overcome the nominal friction load torque of said system.

5. The system of claim 4 wherein the duration of said ramp-up component is substantially equal to one cycle of the natural resonance frequency of the said system.

6. The system of claim 4 wherein each of said step sequences is further characterized as having a torque feedforward ramp-down component that decreases gradually from said sufficient value, at the conclusion of intended armature movement, to zero at a time just subsequent to the instant at which the intended movement of the armature stops.

7. The system of claim 4 additionally including means, operatively connected to said controller, for measuring the load friction torque of said system.

* * * * *